C. M. SNOW.
DREDGE.
APPLICATION FILED JAN. 7, 1911.
1,001,700.
Patented Aug. 29, 1911.
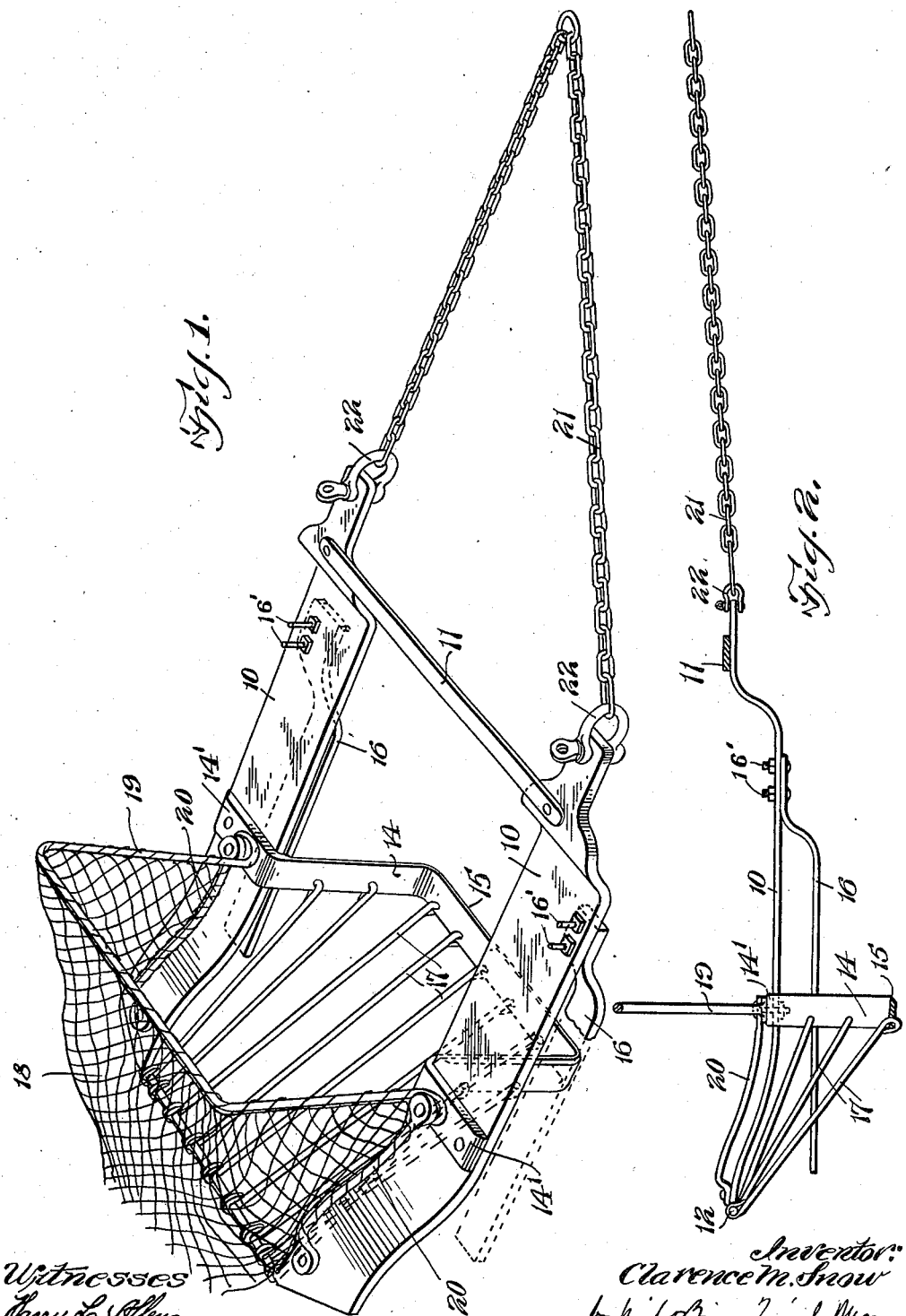

UNITED STATES PATENT OFFICE.

CLARENCE M. SNOW, OF PROVINCETOWN, MASSACHUSETTS.

DREDGE.

1,001,700.  Specification of Letters Patent.  Patented Aug. 29, 1911.

Application filed January 7, 1911. Serial No. 601,398.

*To all whom it may concern:*

Be it known that I, CLARENCE M. SNOW, of Provincetown, in the county of Barnstable and State of Massachusetts, have invented certain new and useful Improvements in Dredges, of which the following is a specification.

This invention relates to dredges, and especially to dredges of the type adapted to be used for gathering quahogs, or other shell-fish, which are to be found beneath the surface of mud, clay, or sand.

The object of the invention is to provide a dredge combining means for gaging the depth to which it may dig, a grid for separating the mud or sand from the shell-fish, and a net or bag attached in such position as to receive the shell-fish which pass over the grid.

Of the accompanying drawings which illustrate one form in which the invention may be embodied:—Figure 1 represents a perspective view of a dredge embodying the aforesaid elements. Fig. 2 represents a longitudinal vertical section of the dredge.

The same reference characters indicate the same parts wherever they occur.

The various elements of the dredge are mounted upon a frame which is of a general rectangular shape. The frame comprises longitudinal horizontal side plates 10, 10, a front cross-bar 11, and a rear cross-bar 12, the cross-bars connecting the ends of one side plate with the ends of the opposite side plate. The cutting or dredging device consists of a strip or bar 14, having a relatively sharp edge 15. The bar has the general characteristics of the letter U, its ends 14' being fixed respectively to the side plates 10. The bar, which is in effect a knife, is arranged so as to depend below the side plates, the transverse horizontal knife portion being connected with the side plates by vertical knife portions.

In order to separate the shell-fish from the soil in which they are embedded, the dredge is provided with rods 17, which are arranged closely enough together to prevent shell-fish of the desired size from passing through. The forward ends of the rods are attached to the strip or bar 14, and their rear ends are attached to the rear cross-bar 12, the rods thus forming a grid and also bracing the knife-bar. Any preferred method may be adopted for attaching the ends of the rods 17 to the knife-bar and to the rear cross-bar. The preferred method is to provide holes in the knife-bar and bend the forward ends of the rods to form loops and to arrange them in the holes. The rear ends of the rods are preferably coiled about the rear cross-bar 12.

For the purpose of collecting the shell-fish which pass over the grid, the dredge is provided with a net or bag 18, a portion of which is attached along the rear cross-bar 12. Any appropriate means may be provided for attaching other portions of the net or bag. The attaching means shown by the drawings consists of a strip or rod 19, the ends of which are affixed to the side plates 10, and the intermediate portion of which extends upwardly and transversely so as to form a connection resembling an arch. For further attaching the net or bag the frame is provided with longitudinal strips 20, 20, each extending from one end of the arch 19 to one end of the cross-bar 12. The cross-bar 12, the longitudinal strips 20, and the arch member 19, when arranged in this manner, constitute a substantially continuous attaching frame to which the entire mouth of the net or bag may be secured.

A bail or any flexible connection may be attached to the dredge for drawing the same. The drawings show a draft chain 21, the ends of which are connected to the forward ends of the plates 10 by shackles 22. A tow-line (not shown) of any desired length may be attached to the draft chain for towing the dredge. The drawings include longitudinal shoes or strips 16, 16, detachably connected to the side plates 10, 10, the detachable connecting means consisting of bolts 16' and clamping nuts. The dredge may be used with or without the shoes 16, depending upon the depth desired. For example, if the dredge is going to be used for digging sea clams at a depth of six inches, the shoes 16, 16 may be detached, and in that event the dredge will run upon the side plates 10, 10 which will act as shoes. The bearing surface of the plates 10, 10, extends in advance of and to the rear of the transverse vertical plane of the knife, and the plates are therefore adapted to keep the horizontal blade of the knife substantially parallel to the surface on which the plates slide.

It will be observed that the rear cross-bar 12 to which the rods 17 are attached and to which the net or bag is attached is considerably above the plane of the forward ends of the side plates 10, the rear ends of the side plates being bent upwardly at an angle to the forward ends. The purpose of bending the plates in this manner is to keep the bag or net somewhat above the surface on which the dredge is sliding, so as to avoid unnecessary wear on the bag. When, for instance, the dredge is to be used for digging quahogs—which are usually at a depth of about three inches—the detachable shoes 16, 16, may be attached in the position in which they are shown. The traction surfaces of the detachable shoes are arranged between the plane of the side plates 10 and the plane of the transverse portion of the knife 14, and they are parallel to the plane of the plates 10, 10. The traction portions of the shoes 16, 16, also extend in advance of and to the rear of the transverse vertical plane of the knife in order to provide a relatively broad base for the dredge, which is necessary in order to prevent it from tipping and going too deep into the mud or sand.

It will be observed that the dredge constructed as described is self-contained and very compact,—the dredge knife, the depth gages, the grid and the net or bag all being attached to the same frame, while the sides of the frame are adapted to act as traction members.

Having thus explained the nature of my invention and described a way of constructing and using the same, though without attempting to set forth all of the forms in which it may be made, or all of the modes of its use, what I claim and desire to secure by Letters Patent is:—

In a dredge, the combination of a pair of sliding shoes arranged side by side and separated from each other, a U-shaped knife extending transversely between the front and rear ends of said shoes, the ends of said knife being fixed with relation to said shoes, and the transverse knife portion depending below said shoes, a front cross-bar connecting the front ends of said shoes, a rear cross-bar connecting the rear ends of the shoes, a plurality of rods extending from the rear of the knife to the rear cross-bar to brace the knife and form a grid, a net, means carried by said shoes for attaching said net in position to receive the articles which pass over said grid, and means connected with the front ends of said shoes for towing the dredge.

In testimony whereof I have affixed my signature, in presence of two witnesses.

CLARENCE M. SNOW.

Witnesses:
M. C. ATWOOD,
M. C. YOUNG.

Copies of this patent may be obtained for five cents each, by addressing the "Commissioner of Patents, Washington, D. C."